United States Patent
Rhemtulla et al.

(10) Patent No.: US 7,324,820 B2
(45) Date of Patent: Jan. 29, 2008

(54) WIRELESS COMMUNICATION MAPPING APPARATUS, SYSTEMS, AND METHODS

(75) Inventors: Amin F. Rhemtulla, Rockaway, NJ (US); Siu H. Lam, WoodCliff Lake, NJ (US); Kai X. Miao, Boonton Township, NJ (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 10/953,566

(22) Filed: Sep. 28, 2004

(65) Prior Publication Data

US 2006/0068805 A1    Mar. 30, 2006

(51) Int. Cl.
*H04Q 7/20* (2006.01)

(52) U.S. Cl. ............... 455/452.2; 455/440; 455/452.1; 455/456.1; 455/457

(58) Field of Classification Search ............. 455/450, 455/455, 507, 67.11, 67.7, 456.1, 456.2, 456.3, 455/451, 452.1, 452.2, 453, 457, 404.2
See application file for complete search history.

(56) References Cited

U.S. PATENT DOCUMENTS

| | | | | |
|---|---|---|---|---|
| 6,091,956 | A * | 7/2000 | Hollenberg | 455/456.5 |
| 7,092,722 | B1* | 8/2006 | Oh et al. | 455/456.1 |
| 2003/0036379 | A1* | 2/2003 | Nikolai et al. | 455/414 |
| 2003/0045303 | A1* | 3/2003 | Oda et al. | 455/456 |
| 2004/0121774 | A1* | 6/2004 | Rajkotia et al. | 455/441 |
| 2004/0147254 | A1* | 7/2004 | Reddy et al. | 455/422.1 |
| 2004/0203855 | A1* | 10/2004 | Veerasamy et al. | 455/456.1 |
| 2006/0007870 | A1* | 1/2006 | Roskowski et al. | 370/252 |

* cited by examiner

*Primary Examiner*—Duc M. Nguyen
*Assistant Examiner*—Dai Phuong
(74) *Attorney, Agent, or Firm*—Schwegman, Lundberg & Woessner, P.A.

(57) ABSTRACT

Apparatus and systems, as well as methods and articles, may operate to generate a system coverage map from a plurality of geosystemic data points, as well as to change wireless system operational parameters responsive to various parameters associated with the plurality of geosystemic data points.

19 Claims, 3 Drawing Sheets

WIRELESS COMMUNICATION MAPPING APPARATUS, SYSTEMS, AND METHODS

TECHNICAL FIELD

Various embodiments described herein relate to communications generally, including apparatus, systems, and methods used to transmit and receive information via wireless networks.

BACKGROUND INFORMATION

Wireless communications systems, including packet-switched radio-frequency (RF) technologies, may be subject to various signal-degrading conditions associated with RF transmission and reception. Weak signals, electromagnetic interference, phase shifts, summation/cancellation of signals, and inter-channel/inter-cell interference may result in dropped calls, distorted audio, and slow data connections. The affected user, operating at the mercy of a poorly-responding system, may only be aware of the result, and not the condition(s) causing it.

DETAILED DESCRIPTION

Figure 1:
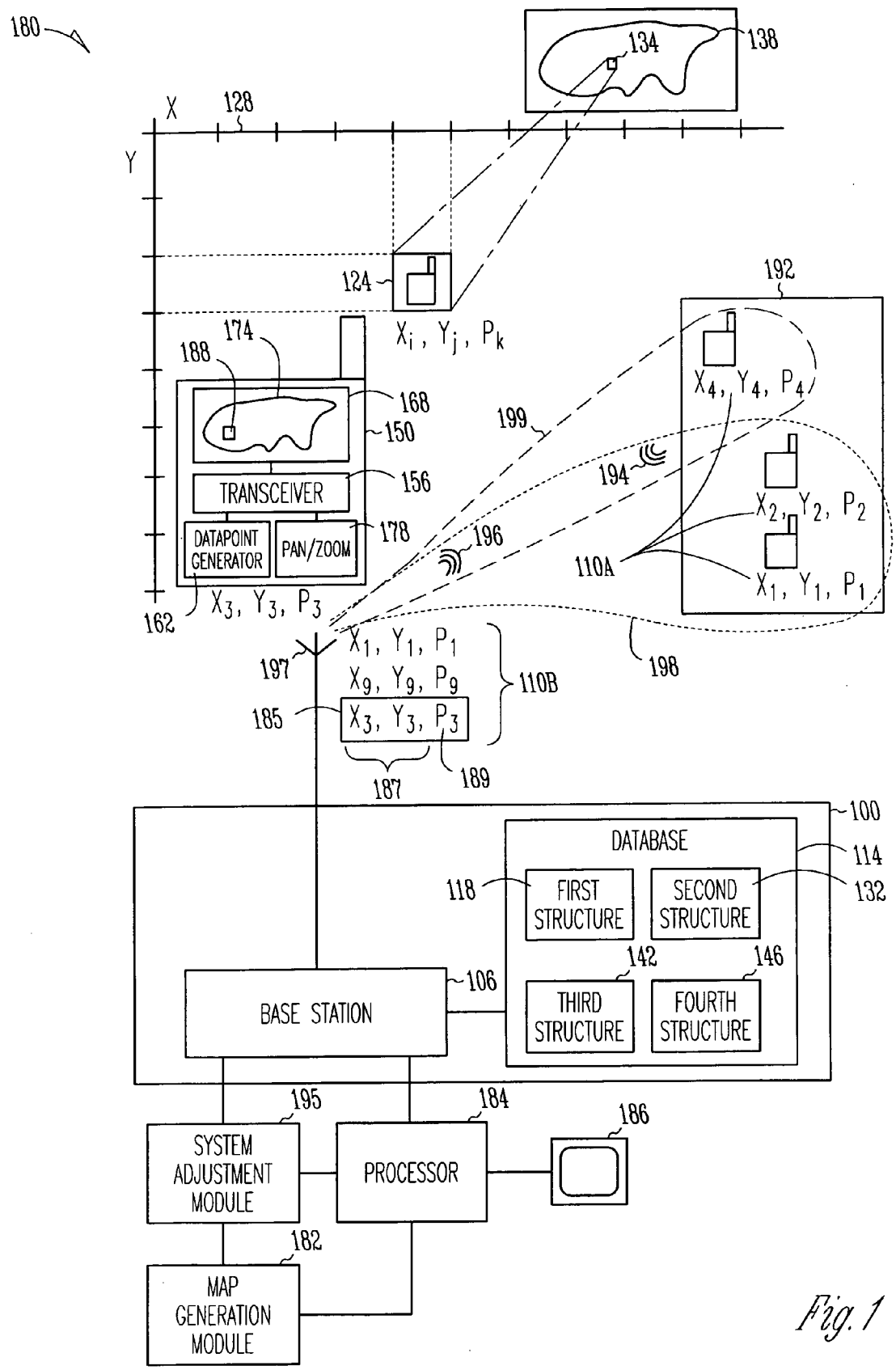
FIG. 1 is a block diagram of an apparatus and a system according to various embodiments of the invention.

Various embodiments disclosed herein may be applied to improve awareness of service quality that may exist at different geographical points within a wireless communications system service area. In some embodiments, poor communication conditions may be improved via inter-system feedback.

Congestion, RF signal conditions, and other systemic factors may vary temporally and/or geographically within a system coverage area, and may greatly affect service quality. Some embodiments disclosed herein may collect these factors (e.g., in the form of data points), and organize them into a real-time, dynamically updated map that can inform users and the system itself of geographically-related signal conditions. Further, the acquired data may be used to make real-time system parametric adjustments, possibly improving system resource effectiveness.

For example, a wireless system may collect a signal-to-noise-ratio (SNR) reported by each currently-active client, and respond by adjusting a base station transmit lobe pattern to increase the SNR for a group of mobile clients in a first area by sacrificing SNR in a second area where no clients are currently located. Collecting the data points, organizing them geographically and temporally, and acting upon the information so organized may comprise a closed-loop feedback system. This technique may result in improved control granularity over various systemic factors.

Thus, some embodiments may identify, categorize, and/or store one or more "geosystemic data points," each of which may comprise a multi-dimensional parameter (e.g., a vector) associated with operating a wireless client (e.g., mobile device) within a wireless system. For example, a first dimension of the geosystemic data point vector may comprise a set of geolocation coordinates corresponding to the location of the wireless client. A second dimension may comprise a time of day, a signal parameter, and/or an on/off state of the wireless client. Any dimension of a geosystemic data point may be stored and/or transmitted separately from any other dimension of the same and/or a different geosystemic data point.

Some embodiments may reference multiple groups of geosystemic data points. For example, a first plurality of points may be sensed at a wireless client and/or transmitted to a base station for processing (e.g., a client may utilize an on-board global positioning system to acquire a set of geolocation coordinates representing the client's location for subsequent transmission to a base station). Alternatively, or in addition, a second plurality of points may be sensed at the base station. For example, one or more base stations may triangulate and acquire a client's location. Thus, referencing the acquired points (as opposed to direct acquisition) may comprise an additional method of determining geosystemic data points. The points may be sensed, acquired, transmitted, received, and/or processed by or between a client, multiple clients, a base station, and/or multiple base stations.

Some embodiments may operate to present one or more system coverage maps, created from a set of geosystemic data points, to mobile users and/or system operators. A system coverage map may indicate areas of variable service reliability by highlighting selected areas in a variety of colors and/or contrasts. In some embodiments, a coverage map may be static, reflecting a historical database of geosystemic data points. Alternatively, a map may be dynamically updated according to recent network activity. A coverage map may be referenced by a mobile user to select a desired area of operation, and/or by a system operator to control system operational characteristics.

In some embodiments, a wireless system may vary system operating characteristics according to the value of one or more geosystemic data point parameters, without user or operator intervention. Such capability may comprise a class of service. For example, a cellular telephone base station may adjust a phased-array antenna beam for better alignment with a client placing an emergency ("911") call, responsive to information indicating the client is experiencing a low SNR.

FIG. 1 comprises a block diagram of an apparatus 100, a wireless client 150, and a system 180 according to various embodiments of the invention. The apparatus 100 may include one or more wireless base station(s) 106 to collect and/or process a plurality of geosystemic data points 100A and/or 110B, a database 114 coupled to the wireless base station(s) 106 to store the plurality of geosystemic data points 110A and/or 110B, and/or a first database structure 118 coupled to the wireless base station(s) 106 to associate a sector 124 of a grid 128 with the plurality of geosystemic data points 110A and/or 110B.

Some embodiments of the apparatus 100 may include a second database structure 132 coupled to the wireless base station(s) 106 to associate the sector 124 of the grid 128 with a corresponding sector 134 of a geophysical map 138, and/or a third database structure 142 coupled to the wireless base station(s) 106 to associate the sector 124 of the grid 128 with an area of system congestion, an area of poor throughput, and/or an area of unsuccessful call attempts, for example. In some embodiments, a fourth database structure 146 may be coupled to the wireless base station(s) 106 to associate the sector 124 of the grid 128 with an electromagnetic field strength. Other embodiments may be realized.

For example, a wireless client 150 may include a mobile device transceiver 156, a geosystemic data point generation module 162 coupled to the mobile device transceiver 156, and/or a human-responsive input-output device 168 coupled to the mobile device transceiver 156. The input-output device 168 may indicate an area 188 on a dynamic system coverage map 174 corresponding to one or more gradations of the received SNR, perhaps indicating multiple regions having desirable and undesirable locations for communicating information. Thus, the area 188 may correspond to gradations including: greater than about a maximum amount of SNR, between about a minimum amount of SNR and about the maximum amount of SNR, and/or less than about the minimum amount of SNR.

In some embodiments of the wireless client 150, the human-responsive input-output device 168 may comprise a display, a tactile device, and/or a speech-recognition device. Some embodiments of the wireless client 150 may include a circuit 178 coupled to the human-responsive input-output device 168 to enable panning and/or zooming. Additional embodiments may be realized.

A system 180 may, for example, include a map generation module 182 coupled to a processor 184 to generate a dynamic system coverage map 174. The system 180 may include a display 186 coupled to the processor 184 to display at least one area 188 of the dynamic system coverage map 174. As noted previously, the displayed area 188 may correspond to a received SNR greater than about a maximum amount, between about a minimum amount and about the maximum amount, and/or less than about the minimum amount.

In some embodiments of the system 180, a plurality of wireless clients 192 may be communicatively coupled to one or more wireless base station(s) 106 to transmit a first plurality of geosystemic data points 110A. In some embodiments of the system 180, the wireless base station(s) 106 may be coupled to the processor 184 to acquire a second plurality of geosystemic data points 110B.

In some embodiments, a geosystemic data point 185 selected from the first plurality of geosystemic data points 110A and/or the second plurality of geosystemic data points 110B may comprise a position 187 of the wireless client 150 on the grid 128, and/or at least one parameter 189. The parameter 189 may include a time of logging the geosystemic data point 185, an on/off state of the wireless client, and/or a parameter associated with call completion, including a number of completed calls, a number of system busy call attempts, and/or a number of dropped calls. The parameter 189 may also include a parameter associated with a first plurality of RF signals 194 originating at the wireless client 150, and/or a second plurality of RF signals 196 originating at the wireless base station 106, including a signal strength, an electromagnetic interference level, an SNR, a frequency, a type of modulation, and/or a phase shift.

Some embodiments of the system 180 may include a geographical map 138 to overlay a grid 128 of two-dimensional sectors. The system 180 may include a database 114 to associate at least one sector 124 selected from the grid 128 of two-dimensional sectors with at least one geosystemic data point 185 selected from the first plurality of geosystemic data points 110A and/or the second plurality of geosystemic data points 110B.

Some embodiments of the system 180 may include a system adjustment module 195 to adjust a system parameter responsive to an acquired parameter 189. For example, an antenna 197 may be coupled to the base station 106 to adjust a transmit envelope 198 responsive to the parameter 189. A transmit envelope 198 so adjusted may resemble, for example, envelope 199. The antenna 197 of some embodiments of the system 180 may include a phased-array antenna, among others.

The apparatus 100; wireless base station 106; geosystemic data points 110A, 110B; database 114; first database structure 118; sector 124; grid 128; second database structure 132; sector 134; geophysical map 138; third database structure 142; fourth database structure 146; wireless client 150; mobile device transceiver 156; geosystemic data point generation module 162; human-responsive input-output device 168; dynamic system coverage map 174; circuit 178; system 180; map generation module 182; processor 184; display 186; area 188; wireless clients 192; geosystemic data point 185; position 187; parameter 189; RF signals 194, 196; system adjustment module 195; antenna 197; transmit envelope 198; and envelope 199 may all be characterized as "modules" herein.

Such modules may include hardware circuitry, and/or a processor and/or memory circuits, software program modules and objects, and/or firmware, and combinations thereof, as desired by the architect of the apparatus 100, wireless client 150, and system 180, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments can be used in applications other than wireless mobile communications, and thus, various embodiments are not to be so limited. The illustrations of apparatus 100, wireless client 150, and system 180 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments include a number of methods.

Figure 2:
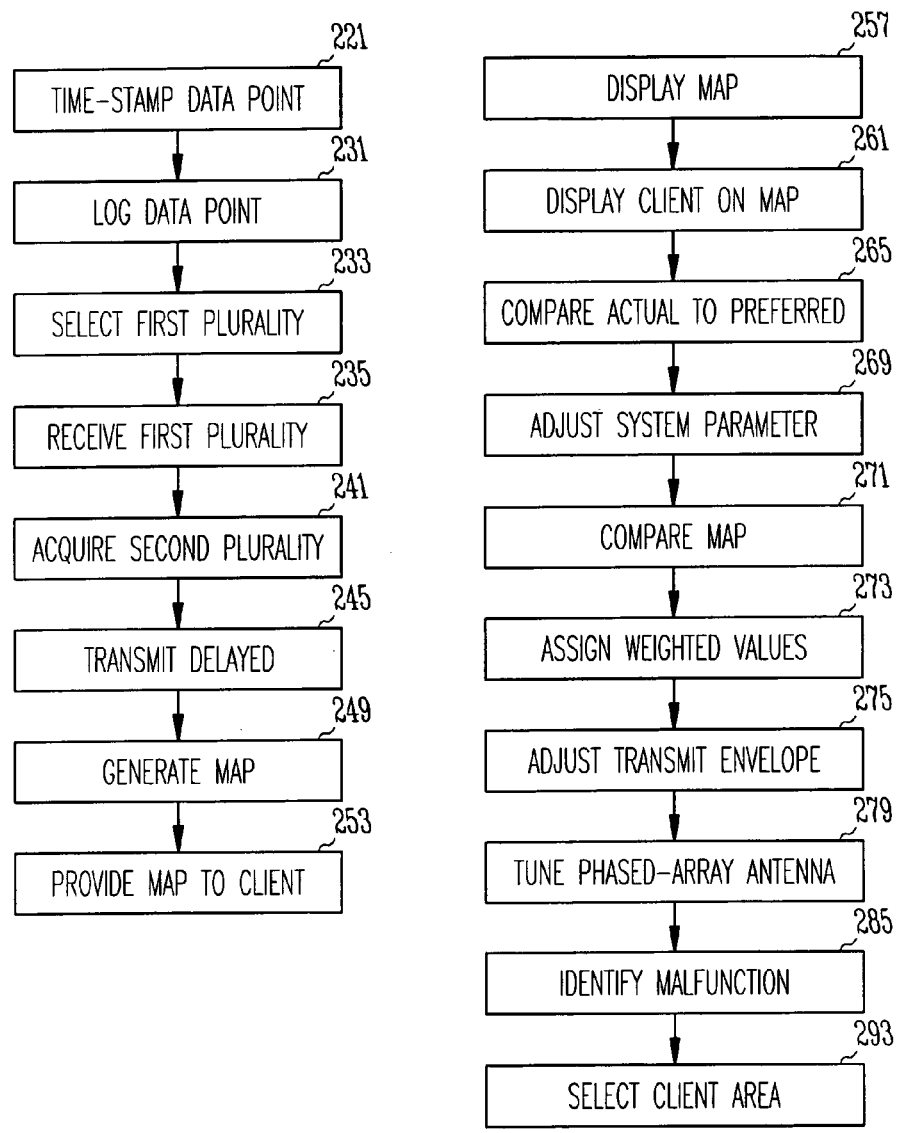
FIG. 2 is a flow diagram illustrating several methods according to various embodiments of the invention.

FIG. 2 is a flow diagram illustrating several methods 211 according to various embodiments of the invention. For example, a method 211 may (optionally) begin at block 221 with time-stamping the acquisition of a first geosystemic data point, and continue with logging the point into the memory of a wireless client at block 231. The method 211 may include selecting a first plurality of geosystemic data points to be acquired by the wireless client at block 233, and/or receiving the first plurality of geosystemic data points at a wireless base station at block 235.

A first geosystemic data point selected from the first plurality of geosystemic data points may comprise a first position of the wireless client on a grid, and/or a first parameter. The first parameter may include an "on" and/or "off" state of the wireless client, a first time of logging the first geosystemic data point, a first completion parameter associated with call completion, and/or a first signal parameter associated with a first plurality of signals received at the wireless client and/or a second plurality of signals transmitted from the wireless client.

The first completion parameter may include a first number of completed calls, a first number of system busy call attempts, and/or a first number of dropped calls. The first signal parameter may include a signal strength, an electromagnetic interference level, an SNR, a frequency, a type of modulation, and/or a phase shift.

The method 211 may continue with acquiring a second plurality of geosystemic data points at the wireless base station at block 241. A second geosystemic data point selected from the second plurality of points may comprise a second position of the wireless client on a grid, and/or a second parameter. The second parameter associated with the second geosystemic data point may comprise a second time of logging the second geosystemic data point, a second completion parameter associated with call completion, and/or a second signal parameter associated with a first plurality of signals received at the wireless base station and/or a second plurality of signals transmitted from the wireless base station.

The second completion parameter may include a second number of completed calls, a second number of system busy call attempts, and/or a second number of dropped calls. The second signal parameter associated with the second geosystemic data point may include a signal strength, an electromagnetic interference level, an SNR, a frequency, a type of modulation, and/or a phase shift, among others.

The method 211 may include transmitting the first geosystemic data point and/or the second geosystemic data point at a delayed time, such as a time following a period of loss of communications with the wireless base station at block 245. The method 211 may also include generating a dynamic system coverage map according to a first plurality of geosystemic data points and/or a second plurality of geosystemic data points at block 249, and/or providing the map to a plurality of wireless clients at block 253.

The method 211 may continue with displaying on a display in a first color first areas of the dynamic system coverage map corresponding to a received SNR greater than about a maximum amount at block 257. The method 211 at block 257 may include displaying on the display in a second color second areas of the dynamic system coverage map corresponding to a received SNR between about a minimum amount and about the maximum amount. The method 211 may also include displaying on the display in a third color third areas of the dynamic system coverage map corresponding to a received SNR of less than about the minimum amount, and/or displaying on the display in a contrasting pattern fourth areas of the dynamic system coverage map corresponding to system congestion, poor throughput, and/or unsuccessful call attempts at block 257. The method 211 may further include displaying a geographical position of the wireless client relative to the dynamic system coverage map as a graphical indication on the display at block 261.

In some embodiments, the method 211 may operate to compare a set of geosystemic data points comprising a first plurality and a second plurality with a set of preferred geosystemic data points at block 265, and/or to adjust one or more system parameters in response, at block 269. For example, the method 211 may compare the dynamic system coverage map to a preferred system coverage map comprising a set of theoretical geosystemic data points at block 271. The set of theoretical geosystemic data points may include a set of position coordinates corresponding to a set of currently-active subscribers to a premium level of service, and their respective, recently-acquired SNRs.

The method 211 may also operate to assign a weighted value to one or more parameters associated with at least one member of the set of theoretical geosystemic data points to provide a class-of-service according to a selected SNR at block 273. A recently-acquired SNR value associated with a relatively higher-tier subscriber may, for example, be adjusted downward for inclusion in the set of theoretical geosystemic data points by an amount greater than an adjustment associated with a relatively lower-tier subscriber. As a consequence, a subsequent system normalization operation based upon SNR may adjust a system parameter to favor the higher-tier subscriber.

At block 275, the method 211 may further operate to adjust a system coverage transmit envelope according to a correlation operation. The correlation operation may be performed on a set of geosystemic data points comprising a first plurality and/or a second plurality, and on the set of theoretical geosystemic data points corresponding to the preferred system coverage map. Following a correlation operation to apportion system resources (e.g., adjusting base station power/bandwidth products to equalize subscriber SNRs), tiered subscribers may experience SNRs proportional to their class-of-service. For example, a transmit envelope may be adjusted according to the method 211 by tuning a phased-array antenna at block 279, to adjust a base station power/bandwidth product.

The method 211 may (optionally) terminate by identifying a malfunctioning wireless base station at block 285 and/or selecting an area of operation of the wireless client at block 293. A wireless system may, for example, command an unmanned spacecraft or self-propelled ocean buoy to move from an area of relatively lower SNR to an area of relatively higher SNR.

The methods described herein do not have to be executed in the order described, or in any particular order. Several of the methods may be executed solely by an apparatus 100, a wireless client 150, a base station 106, or a system 180, as well as by any combination of these. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 3:
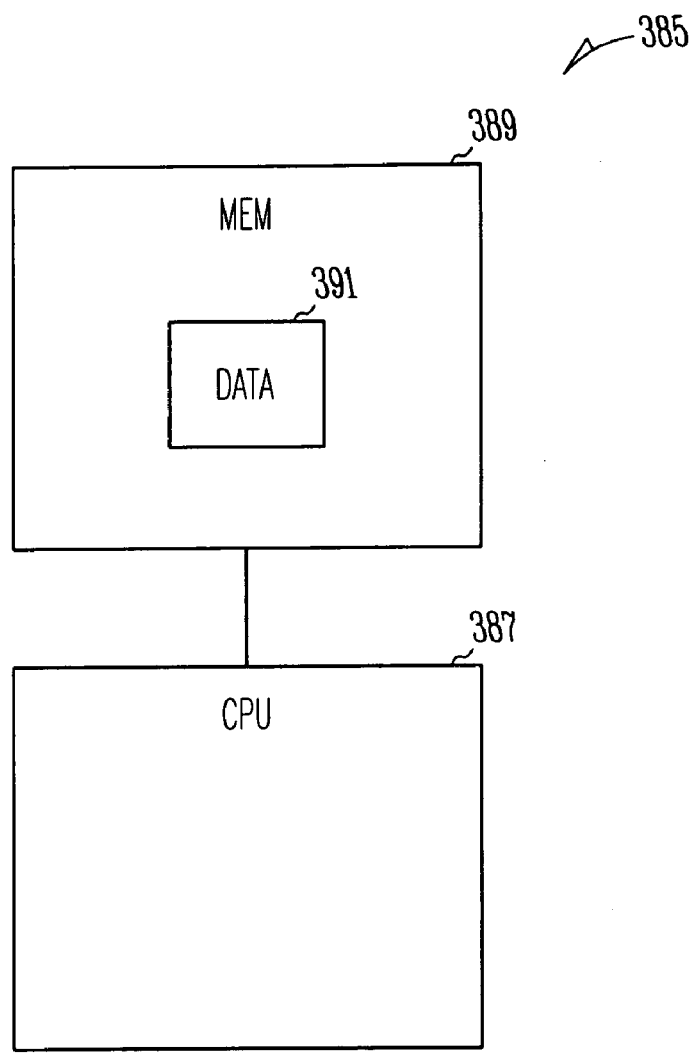
FIG. 3 is a block diagram of an article according to various embodiments of the invention.

For example, FIG. 3 is a block diagram of an article 385 according to various embodiments of the invention. Examples of such embodiments may comprise a computer, a memory system, a magnetic or optical disk, some other storage device, and/or any type of electronic device or system. The article 385 may include a processor 387 coupled to a machine-accessible medium such as a memory 389 (e.g., a memory including an electrical, optical, or electromagnetic conductor) having associated information 391 (e.g., computer program instructions and/or data), which, when accessed, results in a machine (e.g., the processor 387) performing such actions as selecting a first plurality of geosystemic data points to be acquired by a wireless client, receiving the first plurality of geosystemic data points at a wireless base station, acquiring a second plurality of geosystemic data points at the wireless base station, and/or generating a dynamic system coverage map from the plurality of geosystemic data points.

Other activities may include displaying the dynamic system coverage map on a display at the wireless client and/or generating a dynamic system congestion map comprising at least one of the first plurality of geosystemic data points and/or the second plurality of geosystemic data points. Further activities may include identifying a malfunctioning wireless base station and/or selecting an area of operation of the wireless client.

Implementing the apparatus, systems, and methods disclosed herein may identify areas of marginal wireless system performance for identification by users of communications devices. Acquired information may assist in making manual and/or automatic improvements.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of adjusting system coverage comprising:
receiving a first plurality of geosystemic data points associated with a first geographic location of a wireless client at a wireless base station;
acquiring a second plurality of geosystemic data points at the wireless base station associated with a second geographic location of the wireless client;
performing correlation operations on the first and second pluralities of geosystemic data points and a set of theoretical geosystemic data points corresponding to a preferred system coverage map; and
adjusting a transmit envelop based on results of the correlation operations to change a signal parameter, including a signal-to-noise ratio, associated with the wireless client;
wherein the first plurality of geosystemic data points includes one or more signal parameters associated with signals received at the wireless client at the first geographic location or signals transmitted from the wireless client at the first geographic location,
wherein the second plurality of geosystemic data points includes one or more signal parameters associated with signals received at the wireless client at the second geographic location or signals transmitted from the wireless client at the second geographic location.

2. The method of claim 1, wherein a first geosystemic data point selected from the first plurality of geosystemic data points comprises a first position of the at least one wireless client on a grid, and at least one of an "on" state or an "off" state of the at least one wireless client, a first time of logging the first geosystemic data point, a parameter associated with call completion, or a signal parameter associated with at least one of a first plurality of signals received at the at least one wireless client or a second plurality of signals transmitted from the at least one wireless client.

3. The method of claim 2, wherein the parameter associated with call completion includes at least one of a first number of completed calls, a first number of system busy call attempts, or a first number of dropped calls.

4. The method of claim 2, wherein the signal parameter includes at least one of a signal strength, an electromagnetic interference level, a signal-to-noise ratio, a frequency, a type of modulation, or a phase shift.

5. The method of claim 2, further including:
logging the first geosystemic data point into a memory of the at least one wireless client; and time-stamping the first geosystemic data point.

6. The method of claim 1, wherein a second geosystemic data point selected from the second plurality of geosystemic data points comprises a second position of the at least one wireless client on a grid, and at least one of a second time of logging the second geosystemic data point, a parameter associated with call completion, or a parameter associated with at least one of a first plurality of signals received at the wireless base station or a second plurality of signals transmitted from the wireless base station.

7. The method of claim 6, wherein the parameter associated with call completion includes at least one of a second number of completed calls, a second number of system busy call attempts, or a second number of dropped calls.

8. The method of claim 6, wherein the signal parameter includes at least one of a signal strength, an electromagnetic interference level, a signal-to-noise ratio, a frequency, a type of modulation, or a phase shift.

9. The method of claim 1, wherein at least one geosystemic data point included in at least one of the first plurality of geosystemic data points or the second plurality of geosystemic data points is transmitted at a delayed time following a period of loss of communications with the wireless base station.

10. The method of claim 1,
wherein the transmit envelop is adjusted to reduce a SNR for the wireless client when the wireless client has a greater SNR than associated with a user class of the wireless client,
wherein the transmit envelop is adjusted to increase the SNR for the wireless client when the wireless client has a lower SNR than associated with the user class of the wireless client.

11. The method of claim 10, further including:
at the wireless base station, generating a geographical dynamic system coverage map according to at least one of the first plurality of geosystemic data points or the second plurality of geosystemic data points;
providing the geographical dynamic system coverage map to the at least one wireless client from the wireless base station;
displaying on a display in a first color first areas of the geographical dynamic system coverage map corresponding to a received signal-to-noise ratio greater than about a maximum amount;
displaying on the display in a second color second areas of the geographical dynamic system coverage map corresponding to a received signal-to-noise ratio between about a minimum amount and about the maximum amount;
displaying on the display in a third color third areas of the geographical dynamic system coverage map corresponding to a received signal-to-noise ratio of less than about the minimum amount; and
displaying on the display in a contrasting pattern fourth areas of the geographical dynamic system coverage map corresponding to any one of system congestion, poor throughput, and unsuccessful call attempts.

12. The method of claim 11, further including:
comparing the geographical dynamic system coverage map to a preferred system coverage map comprising a set of theoretical geosystemic data points; and
adjusting a system coverage transmit envelope according to a correlation operation to be performed on a set of geosystemic data points comprising the first plurality of geosystemic data points and the second plurality of geosystemic data points and on the set of theoretical geosystemic data points corresponding to the preferred system coverage map.

13. The method of claim 12, further including:
assigning a weighted value to at least one parameter associated with at least one member of the set of theoretical geosystemic data points to provide a class-of-service according to a selected signal-to-noise ratio.

14. The method of claim 1, further including:
comparing a set of geosystemic data points comprising the first plurality and the second plurality with a set of preferred geosystemic data points; and
adjusting at least one system parameter responsive to the comparison.

15. A base station comprising:
a display to display at least one area of a geographical dynamic system coverage map corresponding to one of a received signal-to-noise ratio (SNR) greater than about a maximum amount, between about a minimum amount and about the maximum amount, and less than about the minimum amount, the SNR corresponding to signals received by at least one wireless client, the at least one wireless client configured to transmit a first plurality of geosystemic data points;
a processor coupled to the display to acquire a second plurality of geosystemic data points; and
a map generation module coupled to the processor to generate the geographical dynamic system coverage map and to provide the geographical dynamic system coverage map to the at least one wireless client,
wherein the processor is configured to perform correlation operations on the first and second pluralities of geosystemic data points and a set of theoretical geosystemic data points corresponding to a preferred system coverage map and adjust a transmit envelop based on results of the correlation operations to change a signal parameter, including a signal-to-noise ratio, associated with the wireless client;
wherein the first plurality of geosystemic data points includes one or more signal parameters associated with signals received at the wireless client at the first geographic location or signals transmitted from the wireless client at the first geographic location,
wherein the second plurality of geosystemic data points includes one or more signal parameters associated with signals received at the wireless client at the second geographic location or signals transmitted from the wireless client at the second geographic location.

16. The base station of claim 15, wherein the geographical dynamic system coverage map comprises:
a geographical map to overlay a grid of two-dimensional sectors; and
a database to associate at least one sector selected from the grid of two-dimensional sectors with at least one geosystemic data point selected from at least one of the first plurality of geosystemic data points and the second plurality of geosystemic data points.

17. The base station of claim 16, wherein the at least one geosystemic data point comprises a position of the at least one wireless client on the grid, and at least one of:
a time of logging the geosystemic data point;
an "on" state and an "off" state of the at least one wireless client;
a first parameter associated with call completion, including a number of completed calls, a number of system busy call attempts, and a number of dropped calls; or
a second parameter associated with at least one of a second plurality of radio-frequency (RF) signals originating at the wireless base station or a first plurality of RF signals originating at the at least one wireless client, including a signal strength, an electromagnetic interference level, a signal-to-noise ratio, a frequency, a type of modulation, and a phase shift.

18. The base station of claim 17, further including:
a system adjustment module to adjust a system parameter responsive to one of the first parameter and the second parameter.

19. The base station of claim 18,
wherein the system adjustment module adjusts the transmit envelop to reduce a SNR for the wireless client when the wireless client has a greater SNR than associated with a user class of the wireless client, and wherein the system adjustment module adjusts the transmit envelop to increase the SNR for the wireless client when the wireless client has a lower SNR than associated with the user class of the wireless client.

* * * * *